United States Patent Office 3,488,025
Patented Jan. 6, 1970

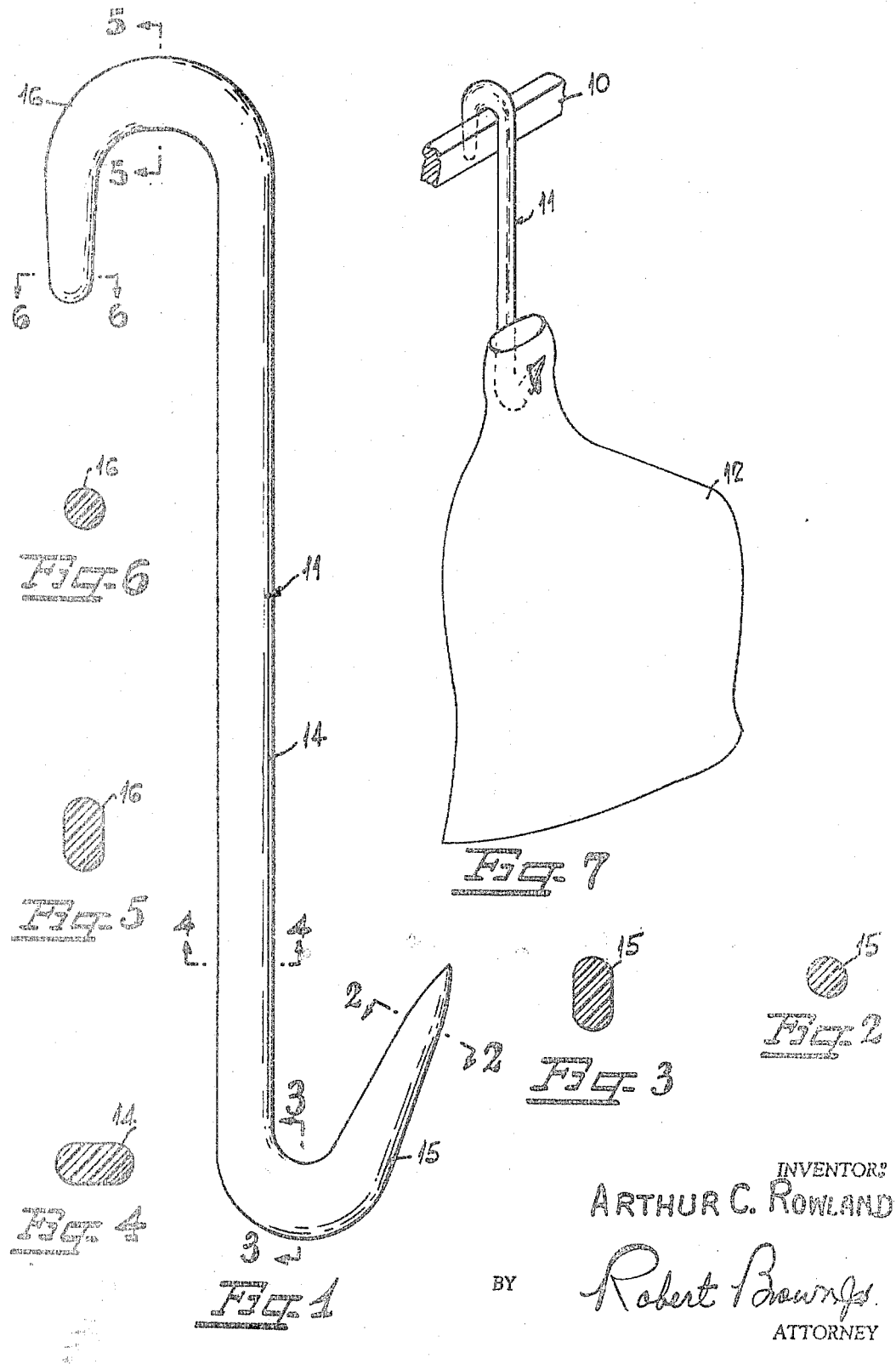

---

3,488,025
THERMOPLASTIC RESINOUS SUSPENSION DEVICE
Arthur C. Rowland, Chicago, Ill., assignor of one-half to William F. Indelli, Chicago, Ill.
Filed Oct. 19, 1967, Ser. No. 676,444
Int. Cl. F16b 45/00; A22c 15/00
U.S. Cl. 248—339
3 Claims

---

ABSTRACT OF THE DISCLOSURE

A sanitary homogeneous meat suspension hanger, comprising an elongated shank having a meat-engaging hook integral with one end thereof and a reversely-bent support hook integral with the other end, and characterized by exceptional capacity for absorbing shocks and vibrations while suspending heavy meat cuts during transportation. The shank and hooks are molded from predominantly thermoplastic resinous materials selected from a group consisting of synthetic linear polyamide polymer, synthetic linear polypropylene polymer, and polycarbonate resins, said materials having a flexural strength of at least 13,000 lbs./sq. in., a flexural modulus of at least 175,000 lbs./sq. in., and a Vicat melting temperature ranging between 290° and 590° F. The reversely-bent hook may be filled with a relatively hard aggregate such as glass or asbestos particles to increase its tensile strength.

---

This invention relates to hanger devices and more especially to an improved hook for suspending meat sides during processing, handling and transportation.

Heretofore, it has been conventional practice to suspend heavy sections of meat with S-shaped metallic hangers, each of which has a rigid open hook for piercing the meat and a similar hook thereabove for detachably supporting the hanger and attached meat from a rack or frame (Patent No. 1,863,743). Although the hanger shape has been generally satisfactory, there has been a long-felt need for a safer, more efficient and more santitary device of this shape.

Conventional metallic meat hooks are relatively harder and more rigid than the attached meat sections and, therefore, the attached meat has a tendency to tear loose and fall, especially when subjected to vibrations and shocks during transportation. Furthermore, metallic hangers easily corrode when exposed to blood, moisture, fats and processing compounds, resulting in contamination and unsanitary condition. Also, metallic hangers are relatively heavy and require considerable care during use to avoid physical injury.

Prior attempts have been made to provide meat suspension devices having means for absorbing shock and vibration occasioned by meat handling (Patent No. 2,707,610), but such devices are heavier, have more parts, and are more easily contaminated. Attempts have also been made to render the hangers more sanitary by employing flexible plastic hangers which pass through the meat sections and have the ends thereof looped around a support (Patent No. 3,007,666), the latter attempt sacrificing the structural simplicity, rigidity and efficiency of the open hooks which are quickly detachable to the meat sections and the supporting racks.

It is therefore an object of this invention to provide a meat suspension device made predominantly of thermoplastic resinous materials having specific properties which will obviate the aforementioned objections to prior art devices.

It is another object of invention to provide a reusable one-piece meat supporting open hook made of materials having physical and chemical properties required to impart greater flexural strength and resilient or shock-absorbing capacity under varied conditions of use.

It is a further object of invention to provide a meat hook which is of lighter weight, chemically inert, heat-resistant, and which has a low coefficient of friction on its surfaces.

Some of the objects of invention having been stated, other objects will appear as the description proceeds when taken in connection with the accompanying drawings, in which:

FIGURE 1 is a side elevation of a suspension device embodying the present invention;
FIGURE 2 is a sectional view taken along line 2—2 in FIGURE 1;
FIGURE 3 is a sectional view taken along line 3—3 in FIGURE 1;
FIGURE 4 is a sectional view taken along line 4—4 in FIGURE 1;
FIGURE 5 is a sectional view taken along line 5—5 in FIGURE 1;
FIGURE 6 is a sectional view taken along line 6—6 in FIGURE 1; and
FIGURE 7 is an isometric view showing a side of meat attached to the lower hook of the hanger and suspended at the upper hook to a rack or bar.

Referring more particularly to the drawings, the numeral 10 denotes a fixed rack or bar such as employed in refrigerated cars and trucks and from which my suspension device 11 and attached meat is supported. Device 11 comprises an elongated shank portion 14, the lower and upper ends of which have integral therewith hook portions 15 and 16 respectively. Portion 15 detachably supports a section of meat 12 and portion 16 is detachably secured to bar 10 when the hanger is in operative position.

The device 11 is molded from homogeneous or predominantly thermoplastic resinous materials such as general purpose nylon and which will maintain a flexural strength of at least 13,000 pounds per square inch. Specific examples of such materials found suitable for the present invention are given below:

EXAMPLE 1

(a) Synthetic linear polyamide polymer, commercially known as nylon and "Zytel."
(b) Long chain synthetic polymeric amide, commercially known as "Nylon C Resin."

EXAMPLE 2

Synthetic linear polypropylene polymer, commercially known as "Profax."

EXAMPLE 3

(a) Polycarbonates of bis-phenol (p,p'-dihydroxydiphenyl-dimethylmethane), commercially known as "Phenoxi" and "Lexan," respectively.
(b) Polycarbonate resin, commercially known as "Nylon 101, Type 6/6."

The approximate Vicat melting or softening temperatures of the above materials are as follows:

| | Degrees F. |
|---|---|
| Linear polyamide (nylon) | 490 |
| Linear polypropylene | 290 |
| Polycarbonate resins | 590 |

Other approximate values of the above thermoplastic resinous materials are:

| | Lbs./sq. in. |
|---|---|
| Flexural strength | 13,000 |
| Flexural modulus | 175,000 |
| Tensile strength | 10,000 |
| Kinetic coefficient of friction | 0.1–0.5 |

The flexural and tensile strengths as listed above will not only be maintained, but will increase with age by approximately 30% without becoming brittle. This increase is due to moisture absorption of about 2.5% over a period of 30 days after manufacture.

It is evident that the upper supporting hook portion 16 may assume various forms and shapes in addition to that shown. Moreover, the portion may be reinforced with a filler material or aggregate of finely divided particles such as powdered or fibrous glass or fibrous asbestos, while leaving the portions 14 and 15 unfilled having the comparatively low melting or softening temperatures given above. In the event filled and unfilled plastic materials are used, the filled materials should be positioned where tensile strength is more important than flexibility and where the brittleness produced by the filler is not objectionable. The use of filler materials is not precluded as long as the required minimum values of flexural strength and related properties are maintained.

Preferred embodiments of the invention have been illustrated in the drawings and specific terms employed in the specification to describe them.

I claim:
1. A molded resilient meat suspension device for absorbing shocks and vibrations while suspending heavy meat cuts during transportation comprising an elongated shank portion having a hook portion integral with one end thereof, said portions being composed of homogeneous predominantly thermoplastic resinous materials having a flexural strength of at least 13,000 lbs./in., and a suspension hook integral with the other end of said shank portion, the latter hook having a flexural strength of at least 13,000 lbs./sq. in. and being composed of said materials filled with a relatively harder aggregate material.

2. A suspension device as defined in claim 1 wherein said aggregate material consists of finely divided glass particles.

3. A suspension device as defined in claim 1 wherein said aggregate material consists of finely divided asbestos particles.

References Cited

UNITED STATES PATENTS

| | | | |
|---|---|---|---|
| 2,904,300 | 9/1959 | Kirk | 248—340 |
| 3,218,018 | 11/1965 | Pusch et al. | 248—340 |

FOREIGN PATENTS

| | | |
|---|---|---|
| 653,589 | 12/1962 | Canada. |
| 370,787 | 3/1939 | Italy. |

ROY D. FRAZIER, Primary Examiner

J. FRANKLIN FOSS, Assistant Examiner

U.S. Cl. X.R.

17—44; 248—304